US007047191B2

(12) United States Patent
Lange et al.

(10) Patent No.: US 7,047,191 B2
(45) Date of Patent: May 16, 2006

(54) METHOD AND SYSTEM FOR PROVIDING AUTOMATED CAPTIONING FOR AV SIGNALS

(75) Inventors: Jeffrey K. Lange, North Tonawanda, NY (US); Robert H. Paine, Honeoye Falls, NY (US); Jeremiah L. Parry-Hill, Averill Park, NY (US); Steven H. Wunrow, Canandaigua, NY (US)

(73) Assignee: Rochester Institute of Technology, Rochester, NY (US)

( * ) Notice: Subject to any disclaimer, the term of this patent is extended or adjusted under 35 U.S.C. 154(b) by 308 days.

(21) Appl. No.: 09/800,212

(22) Filed: Mar. 6, 2001

(65) Prior Publication Data

US 2001/0025241 A1 Sep. 27, 2001

Related U.S. Application Data

(60) Provisional application No. 60/187,282, filed on Mar. 6, 2000.

(51) Int. Cl.
*G10L 15/26* (2006.01)

(52) U.S. Cl. ...................... 704/235; 348/468
(58) Field of Classification Search ................ 725/136, 725/137; 704/235, 7, 2, 251, 246; 348/239, 348/563, 468
See application file for complete search history.

(56) References Cited

U.S. PATENT DOCUMENTS

| 5,294,982 | A | * | 3/1994 | Salomon et al. ............ 348/461 |
| 5,543,851 | A |   | 8/1996 | Chang |
| 5,677,739 | A |   | 10/1997 | Kirkland |
| 5,701,161 | A | * | 12/1997 | Williams et al. ............ 348/468 |
| 5,737,725 | A |   | 4/1998 | Case |
| 5,751,371 | A | * | 5/1998 | Shintani ...................... 348/564 |
| 5,774,857 | A | * | 6/1998 | Newlin ........................ 704/271 |
| 5,815,196 | A | * | 9/1998 | Alshawi ................... 348/14.12 |

(Continued)

FOREIGN PATENT DOCUMENTS

WO  WO9941684  * 8/1999

OTHER PUBLICATIONS

Imai et al, "An Automatic Caption-Superimposing System with a New Continuous Speech Recognizer," IEEE Trans. Broadcast., vol. 40, No. 3, pp. 184-189, 1994.*

(Continued)

*Primary Examiner*—W. R. Young
*Assistant Examiner*—James S. Wozniak
(74) *Attorney, Agent, or Firm*—Nixon Peabody LLP

(57) ABSTRACT

System, method and computer-readable medium containing instructions for providing AV signals with open or closed captioning information. The system includes a speech-to-text processing system coupled to a signal separation processor and a signal combination processor for providing automated captioning for video broadcasts contained in AV signals. The method includes separating an audio signal from an AV signal, converting the audio signal to text data, encoding the original AV signal with the converted text data to produce a captioned AV signal and recording and displaying the captioned AV signal. The system may be mobile and portable and may be used in a classroom environment for producing recorded captioned lectures and used for broadcasting live, captioned lectures. Further, the system may automatically translate spoken words in a first language into words in a second language and include the translated words in the captioning information.

21 Claims, 6 Drawing Sheets

U.S. PATENT DOCUMENTS

| | | | | |
|---|---|---|---|---|
| 5,818,441 A | * | 10/1998 | Throckmorton et al. | 345/717 |
| 5,835,667 A | * | 11/1998 | Wactlar et al. | 704/501 |
| 5,900,908 A | * | 5/1999 | Kirkland | 348/62 |
| 5,929,927 A | * | 7/1999 | Rumreich et al. | 348/563 |
| 5,983,035 A | * | 11/1999 | Funaki | 396/281 |
| 6,076,059 A | | 6/2000 | Glickman et al. | |
| 6,166,780 A | | 12/2000 | Bray | |
| 6,332,122 B1 | * | 12/2001 | Ortega et al. | 704/270 |
| 6,513,003 B1 | * | 1/2003 | Haque et al. | 704/235 |
| 6,567,980 B1 | * | 5/2003 | Jain et al. | 725/61 |
| 6,647,535 B1 | * | 11/2003 | Bozdagi et al. | 715/530 |

OTHER PUBLICATIONS

Watanabe et al, "Automatic Caption Generation for Video Data,—Time Alignment between Caption and Acoustic Signal," Proc. of MMSP99, pp. 65-70, 1999.*

Abstracts 1-13 [retrieved Mar. 21, 2000]. Retrieved from The Computer Database (CDB), NERAC Inc., Question No. 1065787.002, "Demo: Hearing-Impaired".

Stuckless, "Recognition Means More Than Just Getting the Words Right: Beyond Accuracy to Readability," *Speech Technology* pp. 30-35 (Oct./Nov. 1999).

* cited by examiner

METHOD AND SYSTEM FOR PROVIDING AUTOMATED CAPTIONING FOR AV SIGNALS

This application claims the benefit of U.S. Provisional Patent Application Ser. No. 60/187,282 filed on Mar. 6, 2000, which is herein incorporated by reference.

FIELD OF THE INVENTION

This invention relates generally to speech signal processing and, more particularly, to a method and system for providing automated captioning for AV ("audio and visual") signals.

BACKGROUND OF THE INVENTION

There is a growing demand for captioning on television and other AV broadcasts because of the increasing number of hearing impaired individuals. This demand has been enhanced by the implementation of the Americans with Disabilities Act of 1992 ("ADA"), which makes captioning mandatory in many corporate and governmental situations.

There are several methods for providing AV signals with closed or open caption information. One method involves online captioning where the captioning information is provided to the video signal as an event occurs. Online captions are either typed-in from a script or are typed-in in real-time by stenographers as the AV signal is broadcast. Examples where online captioning is typically used are television news shows, live seminars and sports events. Unfortunately, if the speaker or speakers captured on the AV signal deviate from the script(s), then the captions will not match what is actually being spoken. Additionally, the individuals entering the audio signal are prone to error since there is a finite amount of time within which to correct mistakes or to insert any special formatting as the broadcast occurs. Further, the cost of these individuals entering the online captioning is quite high, thus restricting the number of broadcasts where captioning is available.

Another method of captioning involves off-line captioning, where the captioning information is provided to the video signal after the event occurs. In this method, an individual listens to a recorded audio signal and manually inputs the caption information as text in a computer. The individual must listen at a pace they are able to accurately transcribe the audio signal, often rewinding as necessary. Additionally, the individual may add formatting to the caption information as they enter the text in the computer. Unfortunately, many of the same problems discussed above with on-line captioning occur with off-line captioning. Additionally, off-line captioning is a tedious and often time consuming process. Typically, captioning an AV signal may take six hours per every one hour of the recorded AV signal. This type of off-line captioning also imposes significant wear upon the equipment being used and leads to uneven captioning.

SUMMARY OF THE INVENTION

A method for providing captioning in an AV signal in accordance with one embodiment of the present invention includes converting an audio signal in an AV signal to caption data using a speech-to-text processing system and associating the caption data with the AV signal at a time substantially corresponding to a video signal associated with the converted audio signal in the AV signal.

A speech signal processing system in accordance with another embodiment includes a signal separation processing system that a speech-to-text processing system that converts an audio signal in an AV signal to caption data and a signal combination processing system that associates the caption data with the AV signal at a time substantially corresponding to a video signal associated with the converted audio signal in the AV signal.

A computer readable medium having stored thereon instructions for providing captioning in accordance with another embodiment includes steps for converting an audio signal in an AV signal to caption data using a speech-to-text processing system and associating the caption data with the AV signal at a time substantially corresponding to a video signal associated with the converted audio signal in the AV signal.

One advantage of the present invention is its ability to automatically transcribe an audio signal or data in an AV signal into text for inserting caption data back into the AV signal to assist the hearing impaired. Another advantage is that the present invention is able to quickly and inexpensively produce captioning data for AV broadcasts, without the need for any special hardware other than what is presently available in the field of captioning equipment. A further advantage is that it is mobile and portable for use in a variety of environments, such as in a classroom environment for hearing impaired students. Yet another advantage is that the present invention can automatically translate spoken words in a first language into words in a second language to include in the captioning information.

DETAILED DESCRIPTION OF THE INVENTION

Figure 1:
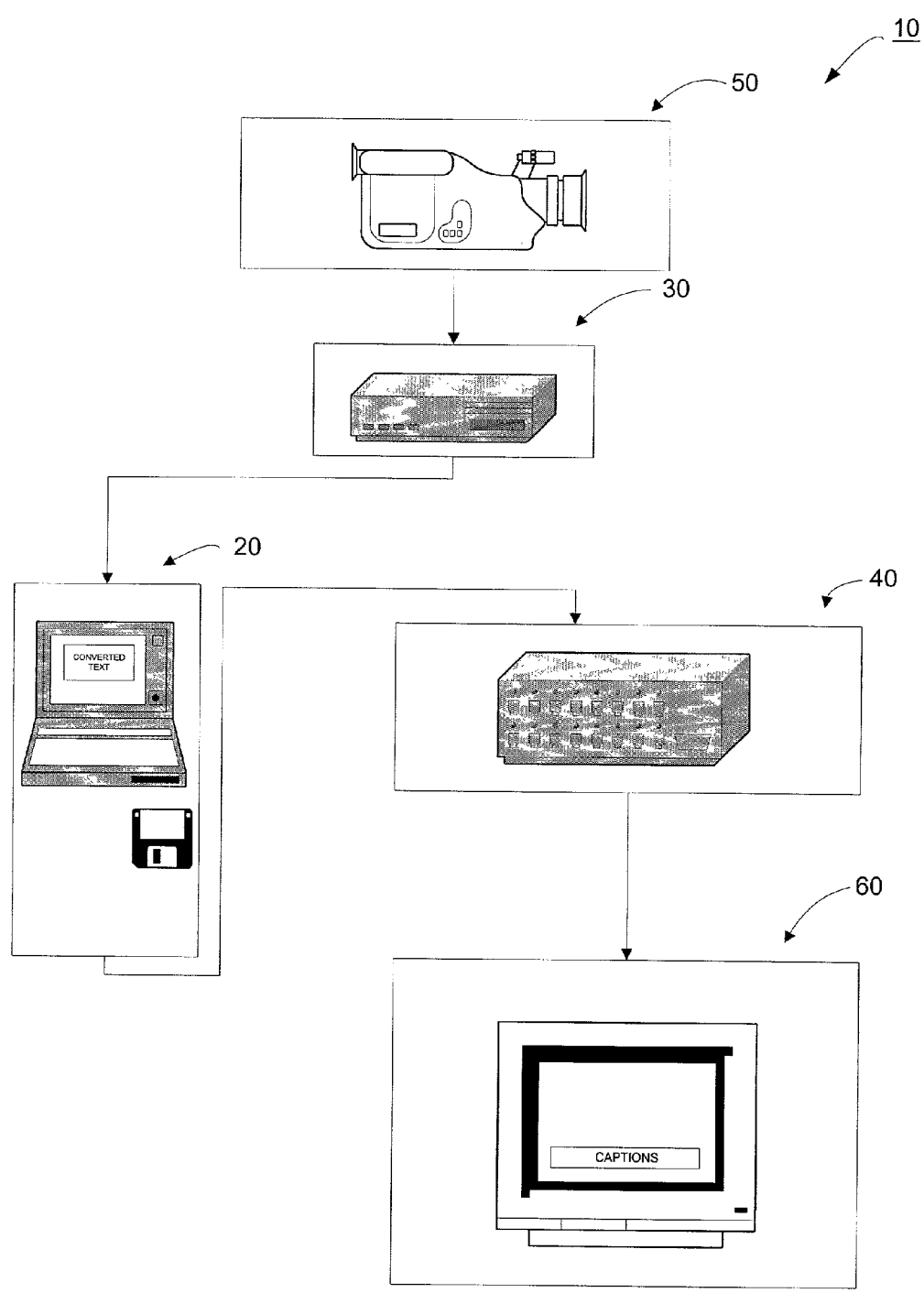
FIG. 1 is a block diagram of a system for video display of captions from speech in accordance with one embodiment of the present invention.

An AV captioning system 10 in accordance with one embodiment of the present invention is shown in FIG. 1. The AV captioning system 10 includes a speech-to-text processor system 20, a signal separation processing system 30, an encoder 40, a video camera 50, and a display device 60. The method and programmed computer readable medium include steps for converting an audio signal in an AV signal to caption data, associating the original AV signal with the caption data to produce a captioned AV signal and recording and/or displaying the captioned AV signal. The present invention includes a number of advantages, such as is its ability to automatically, accurately, quickly and inexpensively produce captioning information from speech to assist the hearing impaired without the need for any special hardware. Moreover, little if any human participation is required with the present invention. The present invention may also be mobile and portable for use in a variety of environments, such as in a classroom environment for hearing impaired students, and can function as a language translation device.

Referring to FIG. 1, video camera 50 is operatively coupled to signal separation processing system 30, speech-to-text processing system 20 is operatively coupled to signal separation processing system 30 and to encoder 40, and encoder 40 is operatively coupled to display device 60, although other configurations for AV captioning system 10 with other components may also be used. For example, in another embodiment AV captioning system 10 is the same as shown in FIG. 1 except that signal separation processing system 30 is coupled to speech-to-text processing system 20 and encoder 40 (not illustrated). In yet another example, AV captioning system 10 is the same as shown in FIG. 1, except that video camera 50 is operatively coupled to encoder 40 in addition to signal separation processing system 30 (not illustrated). Speech-to-text processor system 20, signal separation processing system 30, encoder 40, video camera 50 and display device 60 can be coupled to each other using standard cables and interfaces. Moreover, a variety of different types of communication systems and/or methods can be used to operatively couple and communicate between speech-to-text processing system 20, signal separation processing system 30, encoder 40, video camera 50, and display device 60, including direct connections, a local area network, a wide area network, the world wide web, modems and phone lines, or wireless communication technology each utilizing one or more communications protocols. Speech-to-text processor system 20, signal separation processing system 30 and encoder 40 can include one or more processors (not illustrated), one or more memory storages (not illustrated), and one or more input/output interfaces. Moreover, each of the processors of the above-mentioned systems may be hardwired to perform their respective functions or may be programmed to perform their respective functions by accessing one or more computer readable mediums having the instructions therein. These systems may also include one or more devices which can read and/or write to the computer readable mediums such as a hard disk, 5¼" 360K or 3½" 720K floppy disks, CD-ROM, or DVD-ROM. Additionally, speech-to-text processor system 20, signal separation processing system 30 and encoder 40 can be physically located within the same device, such as in a laptop computer, for example.

More specifically, speech-to-text processing system 20 converts the spoken words in the audio signal of an AV signal into text data utilizing a conventional speech-to-text software application such as such as Dragon Dictate®. Further, speech-to-text processing system 20 synchronizes the processing of AV signals during the various operations of AV captioning system 10. A variety of systems can be used for operating speech-to-text processing system 20, including personal desktop computers, laptop computers, work stations, palm top computers, Internet-ready cellular/digital mobile telephones, dumb terminals, or any other larger or smaller computer systems. For exemplary purposes only, FIG. 1 illustrates a desktop computer such as an IBM, or compatible, PC having a 286 or greater processor and a processing speed of 30 MHz or higher. Moreover, speech-to-text processing system 20 can utilize many different types of platforms and operating systems, including, for example, Linux®, Windows®, Windows CE®, MacIntosh®, Unix®, SunOS®, and variations of each. Moreover, speech-to-text processing system 20 is capable of loading and displaying software user interfaces for allowing users to operate AV captioning system 10. In this particular embodiment, speech-to-text processing system 20 has programmed instructions stored in a computer readable medium for providing automated captioning for AV signals as set forth in the flowcharts in FIGS. 2, 4 and 5 for execution by a processor in accordance with at least one embodiment of the present invention. The programmed instructions may also be stored on one or more computer-readable storage mediums for execution by one or more processors in AV captioning system 10.

Signal separation processing system 30 is any type of conventional AV processing device used for separating, splitting, or otherwise obtaining an audio signal or signals from an AV signal. In this particular embodiment, signal separation processing device 30 receives the AV signal from video camera 50 and processes the AV signal to isolate, split, or otherwise obtain the audio signal from the AV signal. The signal separation processing system 30 also transmits the audio signal to the speech-to-text processing system 20 and the video signal to encoder 40 to be later recombined with the audio signal. Although one embodiment is shown, other configurations are possible. For example, signal separation processing system 30 may amplify the originally received AV signal, if necessary, and split the AV signal. Once the AV signal is split into a first and second AV signal, the first AV signal can be sent to speech-to-text processing system 20 for processing as described in further detail herein below and the second AV signal can be sent to encoder 40 to be later associated with the captioning data, also described in further detail herein below.

Encoder 40 is any type of conventional signal combination device that may be used for real-time and/or off-line open captioning, such as Link Electronics PCE-845 Caption Encoder or any other device that can receive and process text data to produce a captioned AV signal. In this particular embodiment, encoder 40 processes text data received from speech-to-text processing system 20 to produce a captioned AV signal by associating the text data with the original AV signal. It should be appreciated that encoder 40 can produce open or closed captioning information. Therefore, captioning should be construed herein to include both open and closed captioning unless explicitly identified otherwise. Where encoder 40 produces an open captioned AV signal, encoder 40 processes the received text data and associates it with the original AV signal by embedding the text data within the AV signal at a time substantially corresponding to the video signal associated with the converted audio signal in the original AV signal. Thus, the AV signal and the text data (i.e., open captioning information) become integral. Where encoder 40 produces closed captioning information, encoder 40 processes the received text data and associates it with the original AV signal at a time substantially corresponding to the video signal associated with the converted audio signal in the original AV signal by synchronizing the text data with one or more cues, or time codes, corresponding to the original AV signal. Time codes are time references recorded on a video recording medium, such as a video tape, to identify each frame, so the closed captioning data can be associated thereto. Typical time codes include Vertical Interval Time Codes ("VITC") or Linear Time Codes ("LTC"), sometimes referred to as Longitudinal Time Codes. VITC are time codes stored in the vertical interval of a video signal. LTC are time codes recorded on a linear analog track on a video recording medium. In this particular embodiment, VITC are used since multiple lines of VITC can be added to the video signal thereby allowing encoder 40 to encode more information than can be stored using LTC. Although one embodiment is shown, as described above with respect to signal separation processing system 30, encoder 40 may also receive a second AV signal directly from signal separation processing system 30 for associating with the text data received from speech-to-text processing system 20.

In another embodiment, encoder 40 may include a translator processing system (not illustrated). The translator processing system may be any conventional software application that can translate text data in a first language into text data in a second language, such as Systran, for example. The instructions for performing the functions of the translator processing system may be stored in any one of the computer-readable mediums associated with AV captioning system 10. The translator processing system is capable of translating at least one word in a first language of the text data received by the encoder 40 from speech-to-text processing system 20 into a second language before encoder 40 associates the text data with the AV signal to produce the captioned AV signal. Although one embodiment is described above, other configurations are possible. The translator processing system may be included in or be a separate device coupled to speech-to-text processing system 20, encoder 40 or display device 60 within AV captioning system 10.

Video camera 50 is any conventional video camera recording unit capable of capturing and processing images and sounds to produce an audio visual signal (i.e., AV signal). Video camera 50 provides the AV signal to speech-to-text processing system 20 for further processing as described further herein. In other embodiments, other AV signal sources in place of video camera 50 can be used, such as the audio output of a television or prerecorded tapes or other recorded media played by a video cassette recorder, for example. In addition, the AV signal may include such video and corresponding audio programs such as a live newscast or a live classroom lecture in a school. Although one embodiment is shown, other configurations are possible. In addition to producing and transmitting an AV signal to speech-to-text processing system 20, video camera 50 may amplify its produced AV signal, if necessary, and split the AV signal to produce a second AV signal for transmitting directly to encoder 40 to be associated with text data received from speech-to-text processor 20. In another embodiment, video camera 50 may include an audio output and a separate video output, including the appropriate components, for automatically creating a separate audio signal and a video signal. The video output may be coupled to encoder device 40, and the audio output may be coupled to speech-to-text processing system 20. Thus, in this particular embodiment, signal separation processing system 30 would not be necessary, and further, in this example the separate audio and video signals comprise the AV signal.

Display device 60 may comprise any conventional display, such as a projection screen, television or computer display, so long as the particular display is capable of receiving, processing and displaying an AV signal having open or closed captioning data associated therewith. Display device 60 receives the AV signal having associated open or closed captioning data from encoder 40. Where display device 60 receives the AV signal having associated closed captioning data from encoder 40, display device 60 may also include a decoder for recognizing and processing the associated closed captioning data so it can display the closed captioning data with the AV signal. In another embodiment, display device 60 may be located in the same physical location as speech signal processing system 20 or may be located off-site. For example, encoder 40 may be coupled to AV display 60 via a network system. In yet another embodiment, a variety of different formats can be used to format the display of captions, such as in two-line roll-up or three-line roll-up format, for example. Roll-up captions are used almost exclusively for live events. The words appear one at a time at the end of the line, and when a line is filled, it rolls up to make room for a new line. Typically, encoder 40 formats the roll-up captions and causes them to be displayed at the bottom of the display screen in display device 60, although the captions can be placed in other locations.

Figure 2:
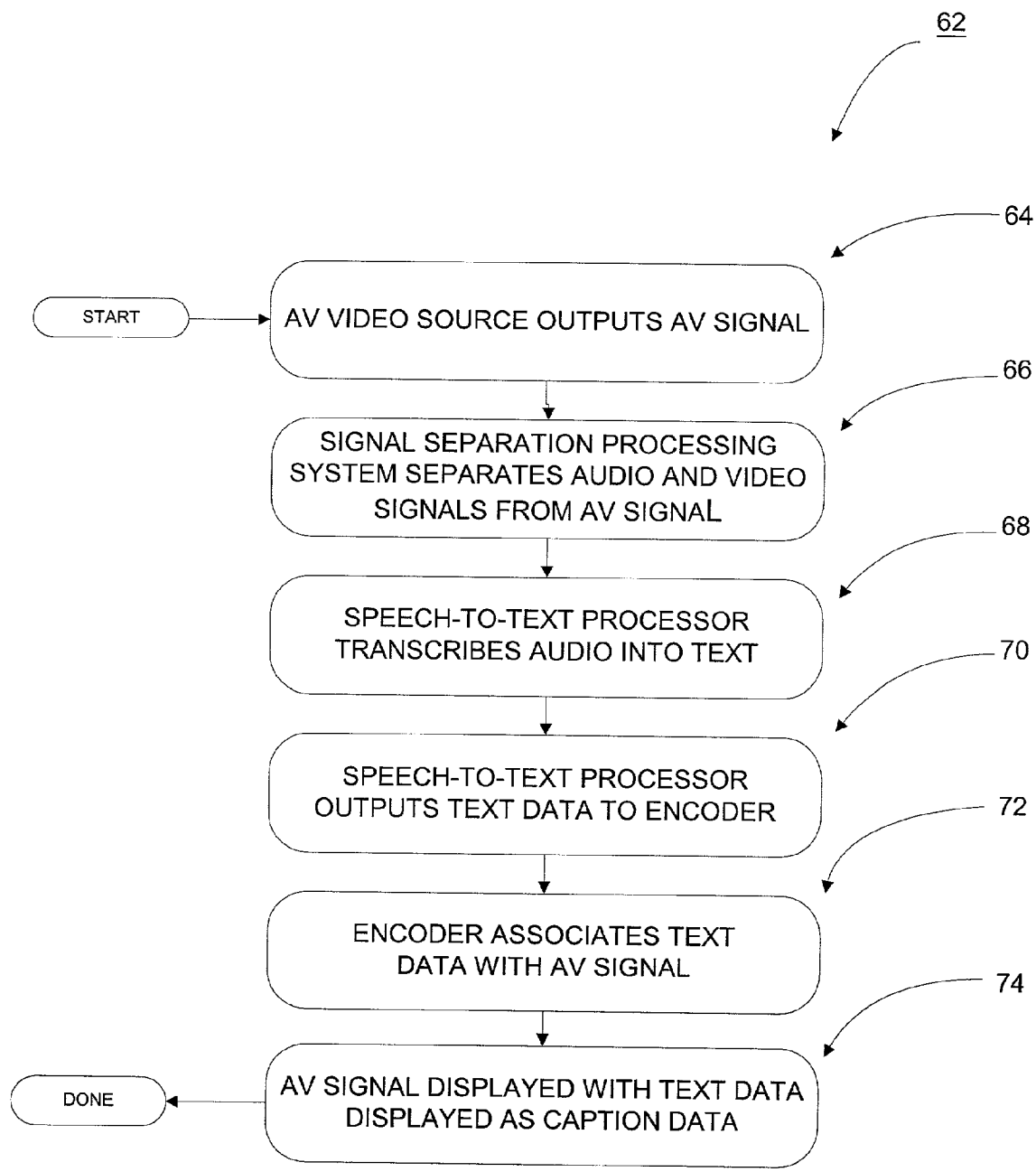
FIG. 2 is a flow chart illustrating steps for the system for video display of captions from speech shown in FIG. 1.

Referring more specifically to FIG. 2, the operation of one of the embodiments of the present invention of AV captioning system 10 will now be described.

Beginning at step 64, video camera 50 begins recording or capturing images and associated audio as an AV signal. A microphone, or other audio capturing device, associated with video camera 50 captures the associated audio while the actual content is being spoken. Video camera 50 outputs the AV signal to signal separation processing system 30. In this particular embodiment, video camera 50 records a classroom lecture, which may or may not be attended by hearing-impaired students, although a variety of different images and audio can be captured. It should be noted that depending on the reliability of the voice signal, AV captioning system 10 may use any voice source, such as spoken, a recorded video session reproduced from a video storage medium played by a video tape recorder ("VTR"), such as a VCR tape or DVD, or telephony-mediated.

At step 66, signal separation processing system 30 receives the AV signal from video camera 50 and begins processing the AV signal. In this particular embodiment, signal separation processing system 30 separates the audio signal from the AV signal and transmits the audio signal to speech-to-text processing system 20, although the audio signal can be transmitted to the speech-to-text processing system 20 in other manners and/or formats. For example, the signal separation processing system 30 may amplify the originally received AV signal, split the amplified AV signal into a first and second AV signal, and then transmit the first AV signal to speech-to-text processing system 20 or the AV signal may already comprise separate audio and video signals.

At step 68, speech-to-text processing system 20 begins processing the audio signal from signal separation processing system 30 and converts speech in the audio signal to text data as described in more detail further below herein. In this particular embodiment, the speech in the audio signal is converted to text as it is received, although the speech can be converted at other rates. Users operating AV captioning system 10 may monitor the speech-to-text processing system 20 for a variety of reasons, such as ensuring that speech-to-text processing system 20 is operating properly, that the text has been transcribed accurately, and/or to add custom formatting to the text that will ultimately be displayed as captioning data in the AV signal displayed by display device 60, as described in more detail further below herein.

At step 70, speech-to-text processing system 20 sends the text data to encoder 40. Speech-to-text processor 20 may automatically send the text data to encoder 40 at predetermined time intervals or when predetermined amounts of speech have been transcribed into text as described in more detail further below herein. Alternatively, a user operating speech-to-text processing system 20 may decide when the text will be sent to encoder 40, also described in further detail herein below. Once encoder 40 receives the transcribed text data, at step 72 it begins producing the captioned AV signal by associating the text data with the original AV signal, as described earlier above in more detail. In another embodiment where a translator processing system is utilized in AV captioning system 10 as described above, the translator processing system translates at least one word in a first language of the audio portion of the AV signal into a second language before encoder 40 associates the text data with the AV signal. In this particular embodiment, a word in Spanish, for example, may be translated into its English equivalent, or vice versa, where the translated word replaces the original word (i.e., the word in Spanish) and is associated with the AV signal as described herein. Moreover, technical terms that are in different languages may be translated into their English equivalent, or vice versa, as well, for example.

At step 74, encoder 40 transmits the captioned AV signal to display device 60. In this particular embodiment, students in a classroom environment may observe display device 60 and read the captioning data displayed therein. Steps 64–74 are continuously executed by speech signal processing system 20 until video camera 50 terminates its transmission of the AV signal to speech-to-text processing system 20 or a user terminates operation of the AV captioning system 10.

Figure 3:
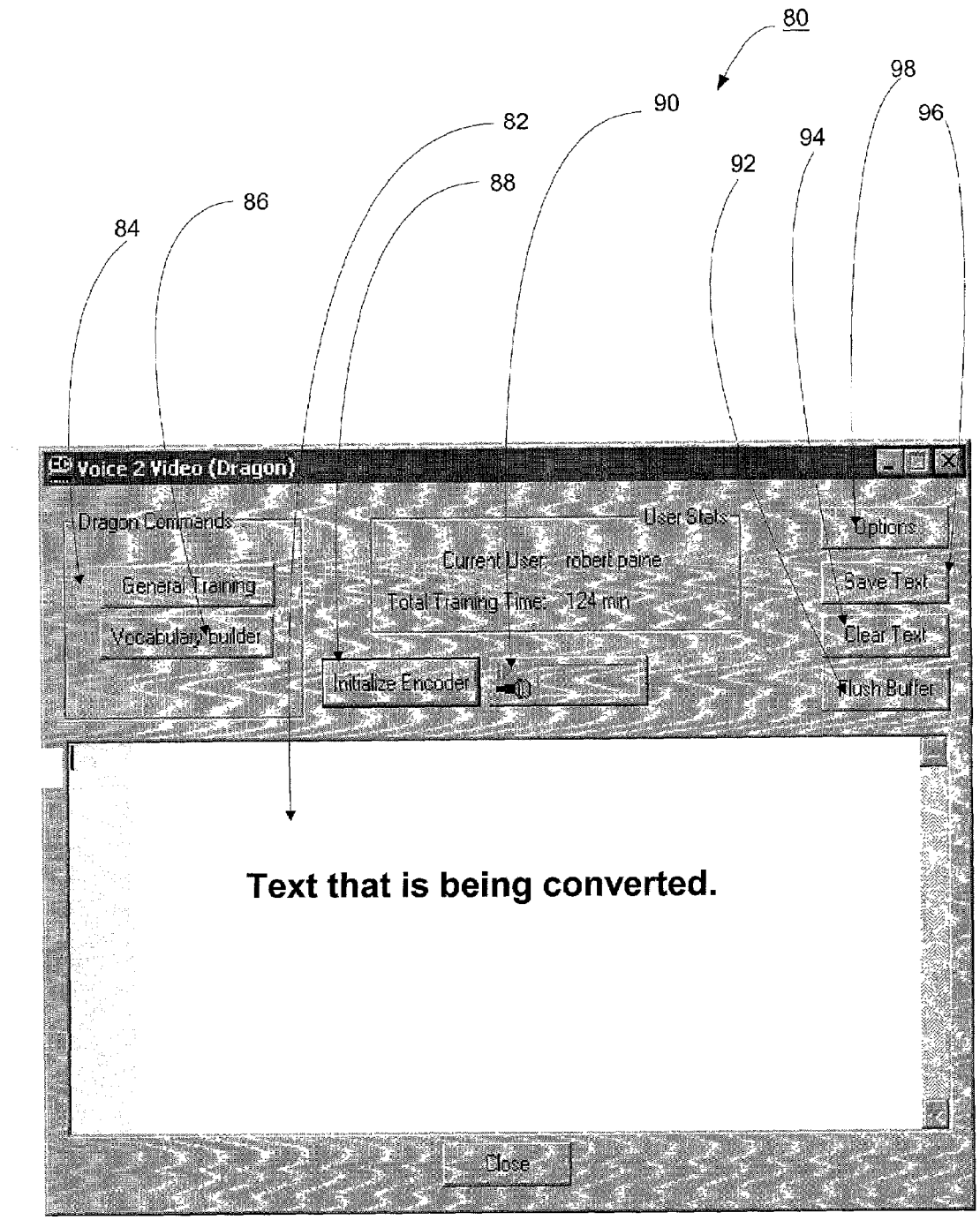
FIG. 3 is an exemplary screen print of a user interface for allowing users to operate the system for video display of captions from speech, in accordance with another embodiment of the present invention.

Referring more specifically to FIG. 3, an exemplary screen print of a user interface 90 for operating AV captioning system 10 will now be described, in accordance with another embodiment of the present invention.

User interface 80 allows users to train text-to-speech processing system 20 to recognize their voice and speech patterns by clicking on general training button 84 using a conventional pointer device such as a computer mouse. Additionally, text-to-speech processing system 20 may comprise a database that stores a master vocabulary for recognizing words. A user may train speech-to-text processing system 20 to learn new words by clicking on vocabulary builder button 86 and inputting the new word and associating their spoken version of the word therewith. Additionally, since various types of encoders 40 may be utilized with speech-to-text processing system 20, a user may cause the AV captioning system 10 to perform a handshake process to recognize a newly added encoder 40 by clicking on initializing encoder button 88, which causes the speech-to-text processing system 20 to recognize which type of encoder 40 is being used and to retrieve its settings so the speech-to-text processing system 20 can communicate with the device. AV captioning system 10 may include a variety of devices for allowing users to enter their speech input into the speech-to-text processing system 20, such as a microphone or pre-recorded audio input, and users can indicate the specific input device they are using by clicking on microphone button 90. Text box area 88 displays text as it is being transcribed by speech-to-text processing system 20. A user can monitor the operation of AV captioning system 10 by observing the contents of text box area 88. If text is transcribed incorrectly, a user may edit the text before allowing it to be sent to encoder 40. As explained above, users may cause speech-to-text processing system 20 to send transcribed text that is displayed in text box area 88 to encoder 40 at any time by pressing flush buffer button 92. Alternatively, users may clear the transcribed text before sending to encoder 40 by clicking on clear text button 94. Further, users may save to a file the transcribed text that appears in text box area 88 by clicking on save text button 96. Additionally, users may set various options with respect to AV captioning system 10 by clicking on options button 98. For example, users may select special types of formatting to be applied to the captioning data once it is displayed in display device 60.

Figure 4:
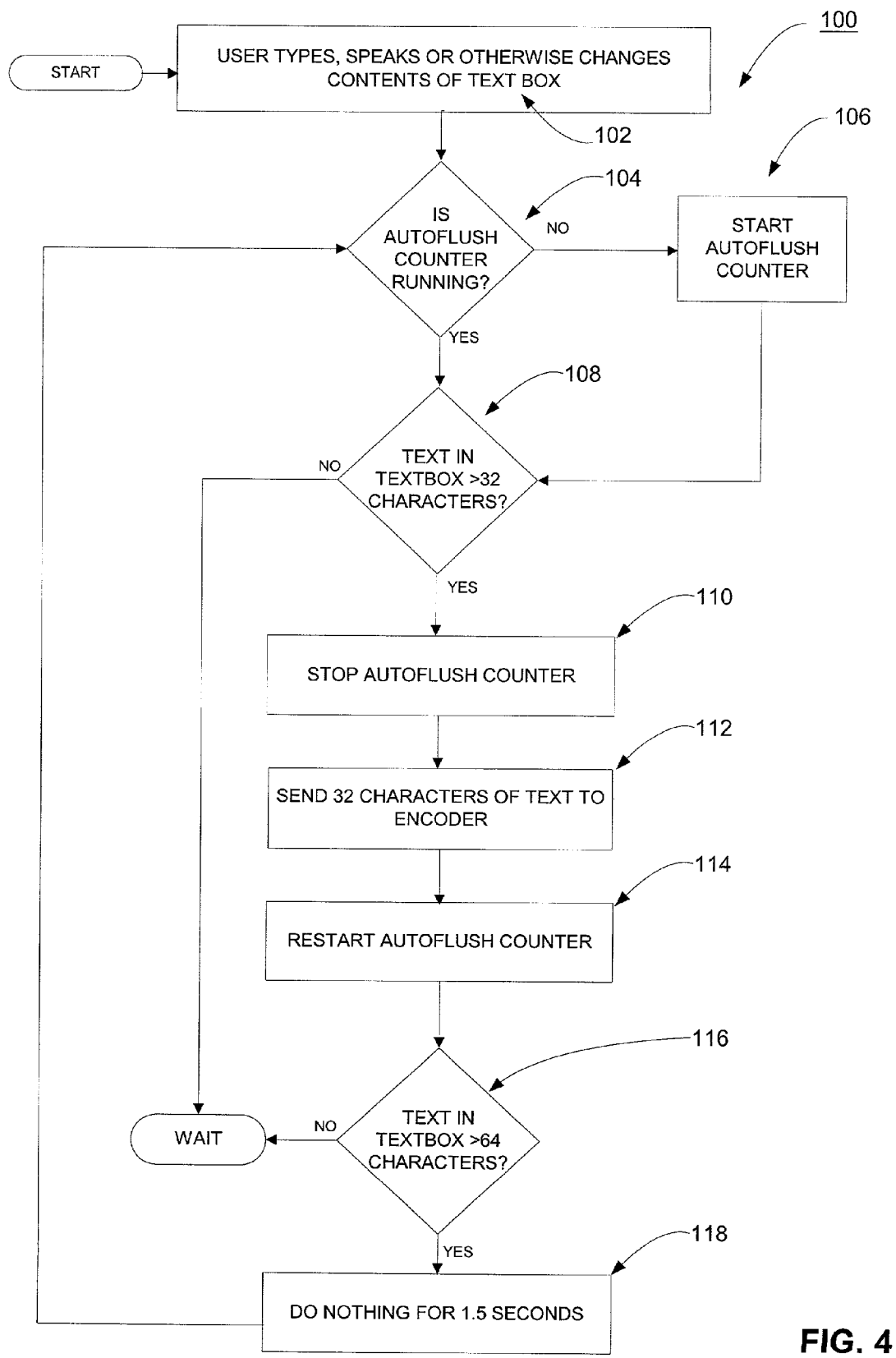
FIG. 4 is a flow chart illustrating steps for processing text contained in the text box area of the user interface shown in FIG. 3, in accordance with another embodiment of the present invention.
Figure 5:
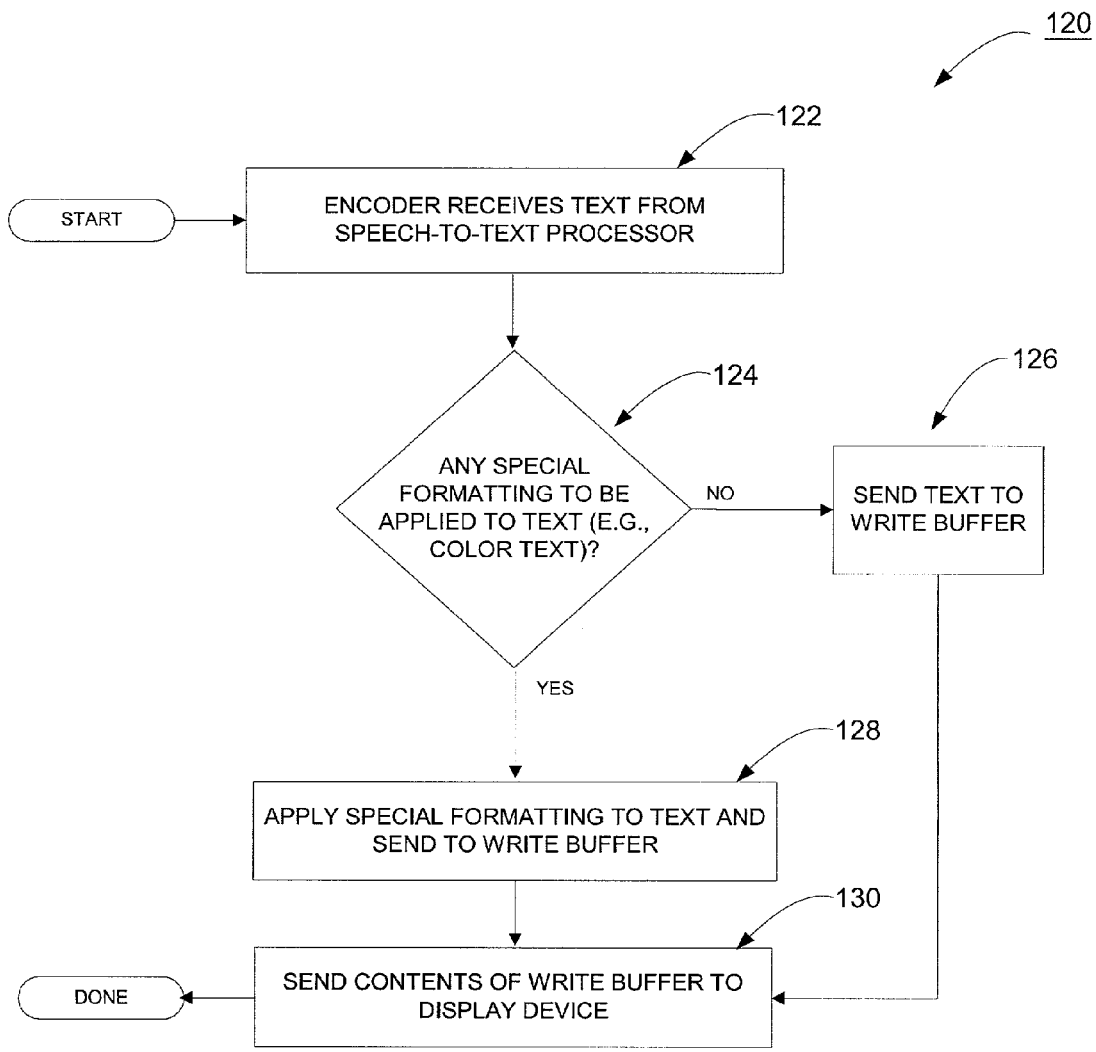
FIG. 5 is a flow chart illustrating steps for sending text to the encoder, in accordance with another embodiment of the present invention.

Referring generally to FIGS. 4–5, the operation processing text data to produce captioned AV signals in accordance with another embodiment of the present invention of AV captioning system 10 will now be described.

Referring more specifically to FIG. 4, during the operation of AV captioning system 10, once a user speaks or otherwise modifies the text contents of text box area 88, speech-to-text processing system 20 determines when to send the text to encoder 40, beginning at step 102. In this particular embodiment, speech-to-text processing system 20 maintains an autoflush counter. In particular, the autoflush counter may comprise a data item, such as a numerical value or character string, that can be incremented by speech-to-text processor 20 at discreet time intervals. Speech-to-text processing system 20 may utilize an internal clock to determine when to increment the value in the autoflush counter, for example. Speech-to-text processor 20 can start and stop the autoflush counter, and can reset the value stored therein. Additionally, the autoflush counter is initially stopped when the method 62 (FIG. 2) begins at step 64. Thus, if any of the events described above occur (i.e., a user speaks), speech-to-text processing system 20 performs step 104 to determine whether the autoflush counter has been started. Also, the autoflush counter is initialized to store an initial value, such as zero, for example, either before, during or after step 104 is performed.

If at step 104 it is determined that the autoflush counter has not been started, then step 106 is performed where the autoflush counter is started. Speech-to-text processing system 20 performs step 108 and determines whether the number of text characters contained in text box area 88 exceeds 32 characters. When the number of characters is less than 32 speech-to-text processing system 20 waits until either the number of characters contained in text box area 88 is greater than 32 or the autoflush counter is greater than or equal to the predetermined maximum value stored therein, in which case step 110 is performed and the autoflush counter is stopped. However, it should be appreciated that in other embodiments lesser or greater than 32 characters may be the determining factor.

At step 112, the text contained in text box area 88 is sent to encoder 40 for further processing as described in more detail further below herein. In this particular embodiment, 32 characters of text may be sent to encoder 40. However, it should be appreciated that in other embodiments lesser or greater than 32 characters may be sent to encoder 40. Step 114 is performed where the autoflush counter is reset to its initial value and restarted. It should be noted that speech-to-text processing system 20 may store additional counters, such as an original text counter (i.e., the number of characters present in text box area 88 when step 102 is performed) and a current text counter (i.e., the number of text characters remaining in text box 88 after step 112 is performed). At step 116, if the original text counter has a value greater than 64, then speech-to-text processing system 20 will wait for a predetermined period of time until resuming at step 104. However, it should be appreciated that in other embodiments lesser or greater than 64 characters may be the determining factor. In this particular embodiment, speech-to-text processing system 20 will wait for 1.5 seconds. If at step 116 it is determined that the current text counter has a value less than or equal to 64, then speech-to-text processing system 20 waits until either the number of characters contained in text box area 88 is greater than 32 (or 64) or the autoflush counter is greater than or equal to the predetermined maximum value stored therein, in which case step 110 and the subsequent steps are performed as described above except that the original text counter and the current text counter are updated as text is generated in text box area 88.

Referring more specifically to FIG. 5, beginning at step 122, encoder 40 receives the text data from speech-to-text processing system 20. At step 124, speech-to-text processing system 20 determines whether the user operating it requested any special formatting to be applied to the text data upon being displayed in display device 60 as open or closed captioning data. In this particular embodiment, the users may inform speech-to-text processing system 20 to display open or closed captioning data within a captioned AV signal in different fonts, colors, sizes or foreign languages, for example.

At step 126, if no special formatting was desired by the user, then the text data is stored in a write buffer, either locally in encoder 40 or in speech-to-text processing system 20. However, if the user desired formatting to be applied to the text data, then step 128 is performed and encoder 40 applies the requested formatting to the text data, and the formatted text data is stored in the write buffer as explained above. Once encoder 40 associates the text data, or formatted text data, with the AV signal to produce a captioned AV signal as explained above in detail in connection with FIG. 2, step 74, encoder 40 transmits the captioned signal to display device 60 to be displayed thereon. Alternatively, encoder 40 may perform step 130 to send the contents of the write buffer to display device 60 at a predetermined time interval in order to allow users sufficient time to read the displayed captioning data in the captioned AV signal. Once step 130 has been performed, the encoder 40 is ready for step 122 to be performed if necessary.

Figure 6:
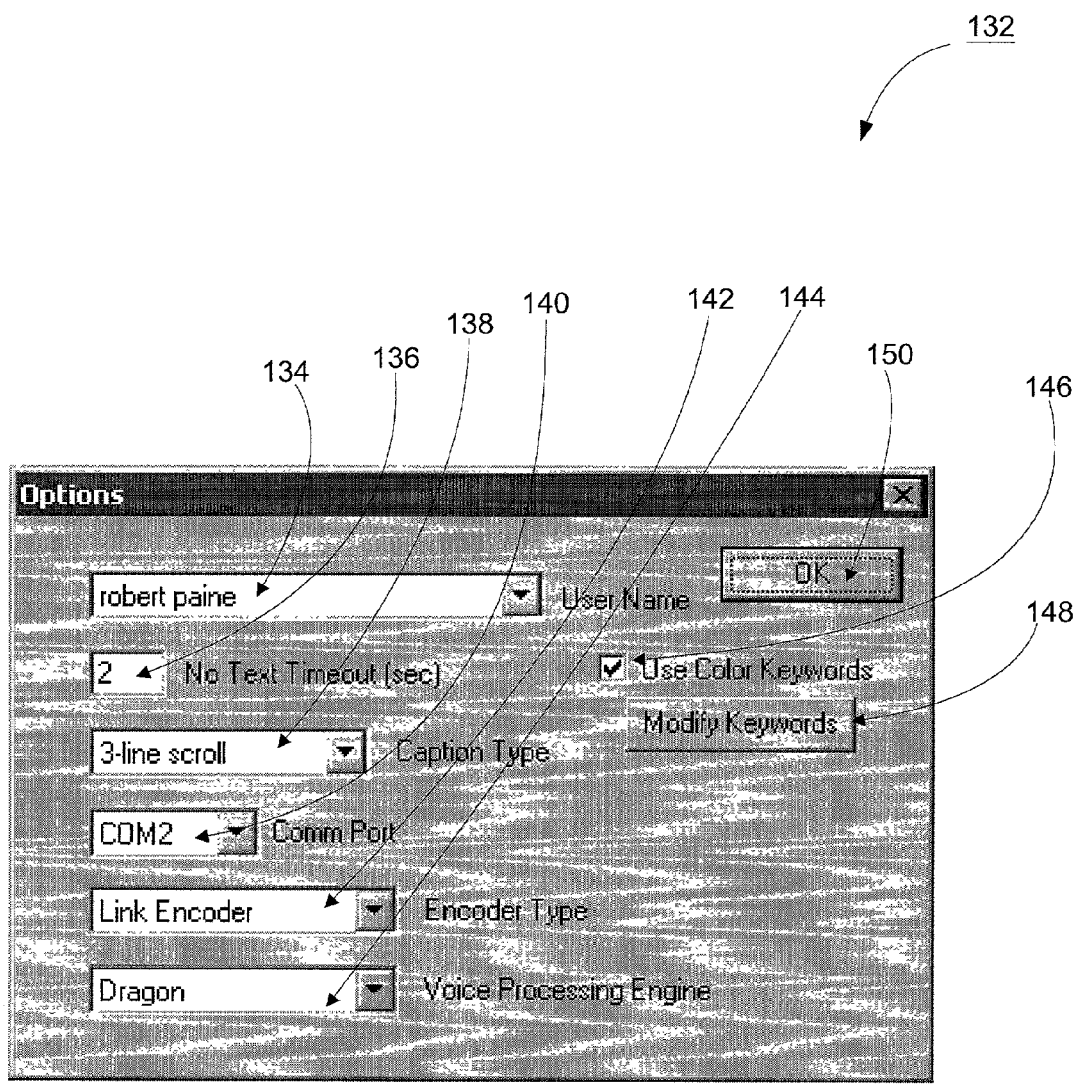
FIG. 6 is an exemplary screen print of a user interface for allowing users to set various options to operate the system for video display of captions from speech, in accordance with another embodiment of the present invention.

Referring more specifically to FIG. 6, an exemplary screen print of an interface that allows users to set various options for AV captioning system 10 will now be described in accordance with another embodiment of the present invention.

The AV captioning system 10 can be acclimated to the voice and style of specific users and can store user profiles for later use. User option interface 132 allows users to inform speech-to-text processing system 20 which particular individual will be providing audio input included in the AV signal as provided by video camera 50 by selecting the user name 134. Users may select a time out period 136 (i.e., autoflush counter) in which speech-to-text processing system 20 will automatically send the converted text contained in the text box area 88 to the encoder 40, as explained above in connection with FIGS. 3–6, when speech-to-text processing system 20 stops generating converted text (i.e., no user is speaking). By selecting the caption type 138, users can inform speech signal processing system 20 how many lines of closed captioning information to display on display device 60 at one time. In this particular embodiment, the AV captioning system 10 displays three-line roll-up closed captions on display device 60. Further, users may inform speech-to-text processing system 20 which communications port of the system couples the encoder 40 thereto by selecting the particular comm port 140. Users may also select the specific type of encoder 40 being used with speech-to-text processing system 20 by selecting the encoder type 142. Additionally, users may select the specific type of speech-to-text processing system 20 utilized by AV captioning system 10 by selecting voice processing engine 106. It should be noted that speech-to-text processing system 20 may utilize one or more different types of encoders 40 simultaneously, and also different speech-to-text processing systems 20, and thus the AV captioning system 10 is not limited to using one specific type of speech-to-text processing system 20 or encoder 40.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A method for providing captioning in an AV signal, the method comprising:

selecting a number of lines of caption data which can be displayed at one time;

determining a type of a caption encoder being used with a speech-to-text processing system;

retrieving settings for the speech-to-text processing system to communicate with the caption encoder based on the identification of the caption encoder;

automatically identifying a voice and speech pattern in an audio signal from a plurality of voice and speech patterns with the speech-to-text processing system;

training the speech-to-text processing system to learn one or more new words in the audio signal;

directly translating the audio signal in the AV signal to caption data automatically with the speech-to-text processing system, wherein the direct translation is adjusted by the speech-to-text processing system based on the training and the identification of the voice and speech pattern;

associating the caption data with the AV signal at a time substantially corresponding with the converted audio signal in the AV signal from which the caption data was directly translated with the speech-to-text processing system, wherein the associating further comprises synchronizing the caption data with one or more cues in the AV signal; and displaying the AV signal with the caption data at the time substantially corresponding with the converted audio signal in the AV signal, wherein the number of lines of caption data which is displayed is based on the selection.

2. The method as set forth in claim 1 further comprising:

capturing the AV signal, the AV signal comprising the audio signal and the video signal; and providing the audio signal in the AV signal for the converting.

3. The method as set forth in claim 1 wherein the converting further comprises:

determining a first amount of data in the caption data; and providing the caption data for the associating when the first amount is greater than a threshold amount or when a first period of time has expired.

4. The method as set forth in claim 1 wherein the associating further comprises embedding the caption data within the AV signal.

5. The method as set forth in claim 1 further comprising displaying at least the video signal and the associated caption data.

6. The method as set forth in claim 1 further comprising storing on at least one recordable medium at least the video signal and the associated caption data.

7. The method as set forth in claim 1 wherein the converting further comprises translating at least one word in a first language of the audio signal into a second language, the at least one translated word included in the caption data.

8. A speech signal processing system, the system comprising:
 a speech-to-text processing system that selects a number of lines of caption data which can be displayed at one time, determines a type of a signal combination processing system being used and retrieves settings for the speech-to-text processing system to communicate with the signal combination processing system based on the identification of the signal combination processing system, automatically identifies a voice and speech pattern in an audio signal from a plurality of voice and speech patterns, trains to learn one or more new words in the audio signal, and directly translates an audio signal in an AV signal to caption data based on the training and the identification of the voice and speech pattern;
 a signal combination processing system that associates the caption data with the AV signal at a time substantially corresponding to the converted audio signal in the AV signal from which the caption data was directly translated with the speech-to-text processing system, wherein the signal combination processing system synchronizes the caption data with one or more cues in the AV signal; and
 a display system that displays the AV signal with the caption data at the time substantially corresponding with the converted audio signal in the AV signal, wherein the number of lines of caption data which is displayed is based on the selection.

9. The system as set forth in claim 8 further comprising a source for providing the audio signal in the AV signal to the speech-to-text processing system.

10. The system as set forth in claim 8 wherein the speech-to-text processing system further comprises a counter that determines a first amount of data in the caption data and a timer that determines when a first period of time has expired, wherein the speech-to-text processing system providing the caption data for the associating when the first amount is greater than a threshold amount or when timer indicates that the first period of time has expired.

11. The system as set forth in claim 8 wherein the signal combination processing system embeds the caption data within the AV signal.

12. The system as set forth in claim 8 further comprising a video monitor for displaying at least the video signal and the associated caption data.

13. The system as set forth in claim 8 further comprising a translator that translates at least one word in a first language of the audio signal into a second language, the at least one translated word included in the caption data, the translating device coupled to the speech recognition processor.

14. The system as set forth in claim 8 wherein the signal separation processing system, the speech-to-text processing system and the signal combination processing system are integrated within a device, the device being portable and usable in a classroom environment.

15. A computer readable medium having stored thereon instructions for providing captioning which when executed by at least one processor, causes the processor to perform steps comprising:
 selecting a number of lines of caption data which can be displayed at one time;
 determining a type of a caption encoder being used with a speech-to-text processing system;
 retrieving settings for the speech-to-text processing system to communicate with the caption encoder based on the identification of the caption encoder;
 identifying a voice and speech pattern in an audio signal from a plurality of voice and speech patterns with the speech-to-text processing system;
 training the speech-to-text processing system to learn one or more new words in the audio signal;
 directly translating the audio signal in the AV signal to caption data automatically with the speech-to-text processing system, wherein the direct translation is adjusted by the speech-to-text processing system based on the training and the identification of the voice and speech pattern;
 associating the caption data with the AV signal at a time substantially corresponding with the converted audio signal in the AV signal from which the caption data was directly translated with the speech-to-text processing system, wherein the associating further comprises synchronizing the caption data with one or more cues in the AV signal; and
 displaying the AV signal with the caption data at the time substantially corresponding with the converted audio signal in the AV signal, wherein the number of lines of caption data which is displayed is based on the selection.

16. The medium as set forth in claim 15 further comprising:
 capturing the AV signal, the AV signal comprising the audio signal and the video signal; and providing the audio signal in the AV signal for the converting.

17. The medium as set forth in claim 15 wherein the converting further comprises:
 determining a first amount of data in the caption data; and
 providing the caption data for the associating when the first amount is greater than a threshold amount or when a first period of time has expired.

18. The medium as set forth in claim 15 wherein the associating further comprises embedding the caption data within the AV signal.

19. The medium as set forth in claim 15 further comprising displaying at least the video signal and the associated caption data.

20. The medium as set forth in claim 15 further comprising storing on at least one recordable medium at least the video signal and the associated caption data.

21. The medium as set forth in claim 15 wherein the converting further comprises translating at least one word in a first language of the audio signal into a second language, the at least one translated word included in the caption data.

* * * * *